(12) United States Patent
Nagataki et al.

(10) Patent No.: US 10,495,444 B2
(45) Date of Patent: Dec. 3, 2019

(54) PIPE MEASURING APPARATUS

(71) Applicant: MITUTOYO CORPORATION, Kanagawa (JP)

(72) Inventors: Yuichi Nagataki, Kanagawa (JP); Takao Kawabe, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/040,957

(22) Filed: Jul. 20, 2018

(65) Prior Publication Data
US 2019/0041188 A1 Feb. 7, 2019

(30) Foreign Application Priority Data
Aug. 3, 2017 (JP) .................. 2017-150470

(51) Int. Cl.
*G01B 11/00* (2006.01)
*G01B 11/25* (2006.01)

(52) U.S. Cl.
CPC ............ *G01B 11/005* (2013.01); *G01B 11/25* (2013.01)

(58) Field of Classification Search
CPC .............................. G01B 11/005; G01B 11/25
USPC ...... 356/600–640, 237.1–237.6, 239.1–239.7
See application file for complete search history.

(56) References Cited

U.S. PATENT DOCUMENTS

| 5,008,555 | A | * | 4/1991 | Mundy | ............... | G01B 11/00 250/559.22 |
| 5,046,852 | A | * | 9/1991 | Hametner | ............ | B21D 5/004 356/398 |
| 2011/0164244 | A1 | * | 7/2011 | Honda | ............... | G01B 5/163 356/72 |
| 2015/0345933 | A1 | | 12/2015 | Nagataki et al. | | |

FOREIGN PATENT DOCUMENTS

JP 2015-227816 A 12/2015

* cited by examiner

*Primary Examiner* — Tri T Ton
(74) *Attorney, Agent, or Firm* — Greenblum & Bernstein, P.L.C.

(57) ABSTRACT

A pipe measuring apparatus includes a measurement probe that performs a non-contact measurement of a pipe as a measurable object; and a displacement mechanism that relatively displaces the measurement probe in three mutually orthogonal axis directions relative to the pipe.

15 Claims, 5 Drawing Sheets

PIPE MEASURING APPARATUS

CROSS-REFERENCE TO RELATED APPLICATIONS

The present application claims priority under 35 U.S.C. § 119 of Japanese Application No. 2017-150470, filed on Aug. 3, 2017, the disclosure of which is expressly incorporated by reference herein in its entirety.

BACKGROUND OF THE INVENTION

1. Field of the Invention

The present invention relates to a pipe measuring apparatus that measures a pipe with a non-contact probe.

2. Description of Related Art

Conventionally, in order to address the need to measure a pipe as a measured object in a short amount of time and with a rough degree of measurement accuracy, a non-contact probe is attached to a tip of a multijoint mechanism of a multijoint arm-type measuring device (Japanese Patent Laid-open Publication No. 2015-227816).

However, measurement with the multijoint arm-type measuring device described above is performed manually by a measurement operator, and therefore there is significant measurement error arising from the operation by the measurement operator. In addition, the measurement accuracy of the multijoint arm-type measuring device is poor, and therefore a pipe cannot be measured with a high degree of accuracy.

SUMMARY OF THE INVENTION

In view of these circumstances, the present invention provides a pipe measuring apparatus capable of measuring a pipe with a high degree of accuracy.

According to one aspect of the present invention, a pipe measuring apparatus is provided that includes a pipe measurement probe that performs a non-contact measurement of a pipe as a measured object; and a displacement mechanism that relatively displaces the pipe measurement probe in three mutually orthogonal axis directions relative to the pipe.

The pipe measuring apparatus may also be configured to further include a memory that stores a parts program that relates to operations of the displacement mechanism during measurement of a single pipe; and a controller that causes the measurement to be performed in accordance with the parts program stored in the memory, when measuring a pipe having a shape identical to the single pipe.

The pipe measurement probe may also be configured to emit two laser lights such that the laser lights intersect with the pipe, and perform a non-contact measurement of the pipe.

The pipe measuring apparatus may also be configured to further include a controller that displaces the pipe measurement probe with the displacement mechanism such that the two laser lights contact an end face of the pipe.

The pipe measurement probe may also be configured to include two tip portions that are split in a forking shape, and to emit the two laser lights between the two tip portions.

According to the present invention, a pipe measuring apparatus can be provided that is capable of measuring a pipe with a high degree of accuracy.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Configuration of Pipe Measuring Apparatus

Figure 1:
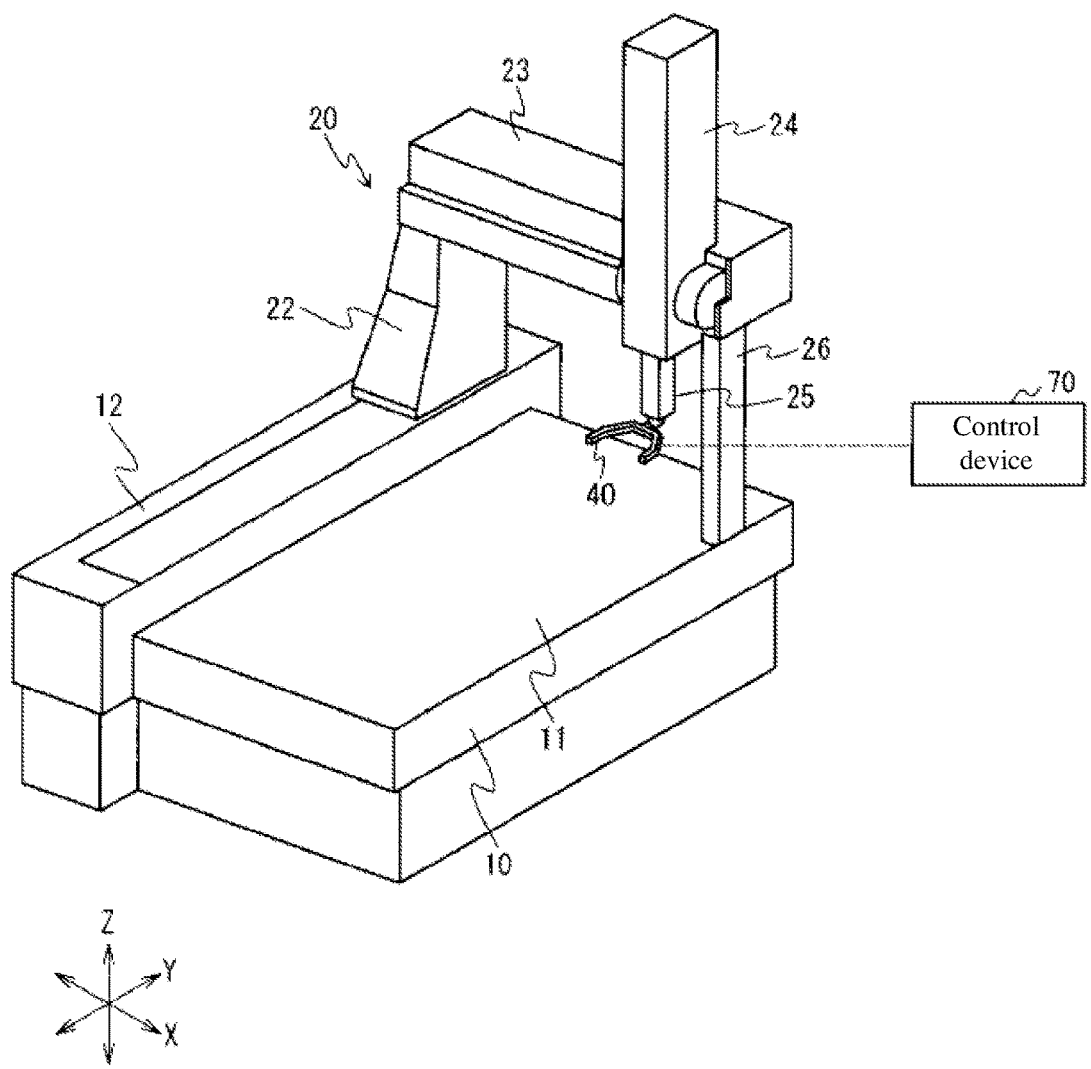
FIG. 1 illustrates an external configuration of a pipe measuring apparatus according to an embodiment of the present invention.
Figure 2:
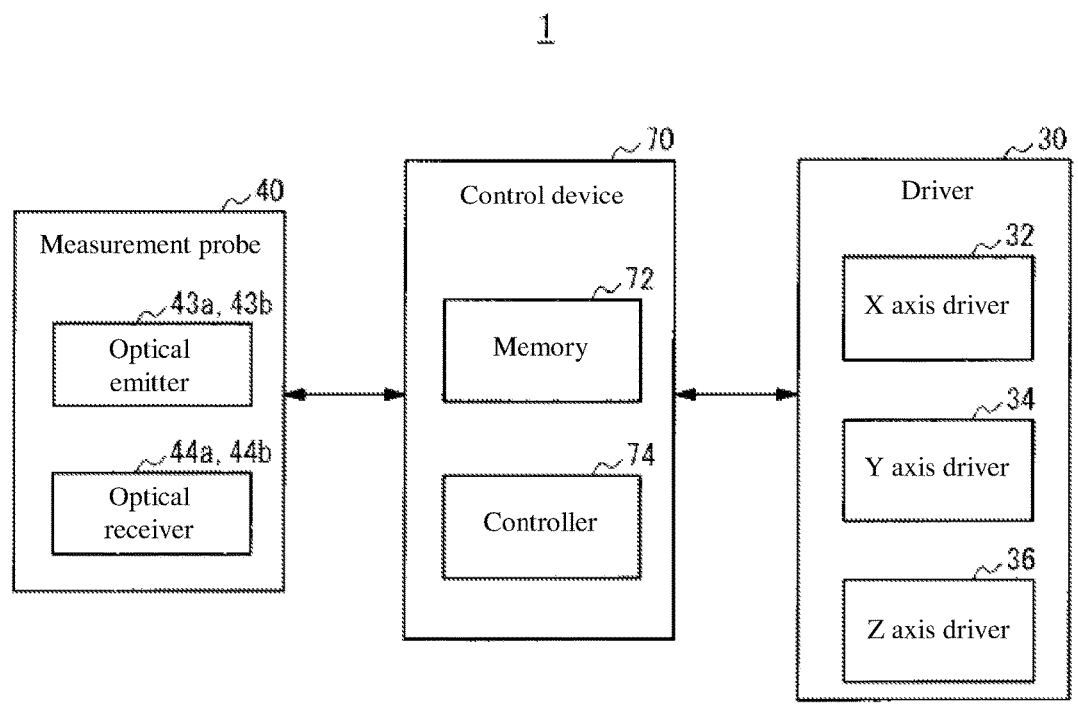
FIG. 2 is a block diagram partially illustrating a configuration of functions of the pipe measuring apparatus.

A configuration of a pipe measuring apparatus 1 according to an embodiment of the present invention is described with reference to FIGS. 1 and 2. FIG. 1 illustrates an external configuration of the pipe measuring apparatus 1 according to the embodiment. FIG. 2 is a block diagram partially illustrating a configuration of functions of the pipe measuring apparatus 1.

The pipe measuring apparatus 1 is a measuring apparatus that makes a non-contact measurement of a pipe. The pipe measuring apparatus 1 is also a coordinate measuring apparatus capable of displacement in, for example, three mutually orthogonal axis directions (X axis, Y axis, and Z axis directions). As illustrated in FIG. 1, the pipe measuring apparatus 1 includes a base 10, a displacement mechanism (displacer) 20, a measurement probe 40, and a control apparatus 70.

As illustrated in FIG. 1, the base 10 has a rectangular plate shape. The base 10 has a placement surface 11 on which a work piece (measured object or measurable object) is placed. In the present embodiment, a pipe serving as the work piece can be placed on the base 10.

A guide 12 is provided along the Y axis direction on one X-axis-direction end of the base 10. The guide 12 guides the displacement of the displacement mechanism 20 (specifically, a column 22 of the displacement mechanism 20) in the Y axis direction.

The displacement mechanism 20 displaces the measurement probe 40, which is mounted to the foremost end of the ram 25, in the X, Y, and Z axis directions. The displacement mechanism 20 includes the column 22, a beam 23, a slider 24, a ram 25, and a driver 30.

The column 22 stands upright on the guide 12. The column 22 is capable of being displaced by the driver 30 (FIG. 2) so as to be displaced along the guide 12 in the Y axis direction.

The beam 23 is provided so as to extend in the X axis direction. One length-direction end of the beam 23 is supported by the column 22, while the other length-direction end of the beam 23 is supported by a support column 26. The beam 23 displaces in the Y axis direction together with the column 22.

The slider 24 is supported by the beam 23 and is formed in a tube shape along the Z axis direction. The slider 24 is capable of being displaced by the driver 30 so as to be displaced along the beam 23 in the X axis direction.

The ram 25 is inserted through an interior of the slider 24 and displaces in the X axis direction together with the slider 24. The ram 25 is also capable of being displaced by the driver 30 so as to be displaced within the slider 24 in the Z axis direction.

The driver 30 is a drive source that causes the column 22, the slider 24, and the ram 25 to displace. As illustrated in FIG. 2, the driver 30 includes an X axis driver 32, a Y axis driver 34, and a Z axis driver 36. The X axis driver 32, Y axis driver 34, and Z axis driver 36 each include a drive motor. The X axis driver 32 displaces the slider 24 in the X axis direction. The Y axis driver 34 displaces the column 22 in the Y axis direction. The Z axis driver 36 displaces the ram 25 in the Z axis direction.

The measurement probe 40 is a pipe measurement probe that makes a non-contact measurement of a pipe. Specifically, the measurement probe 40 performs a measurement by firing laser light at a pipe. The measurement probe 40 is detachably mounted on the ram 25. A probe other than a pipe measurement probe can also be mounted to the ram 25 as the measurement probe 40.

Figure 3:
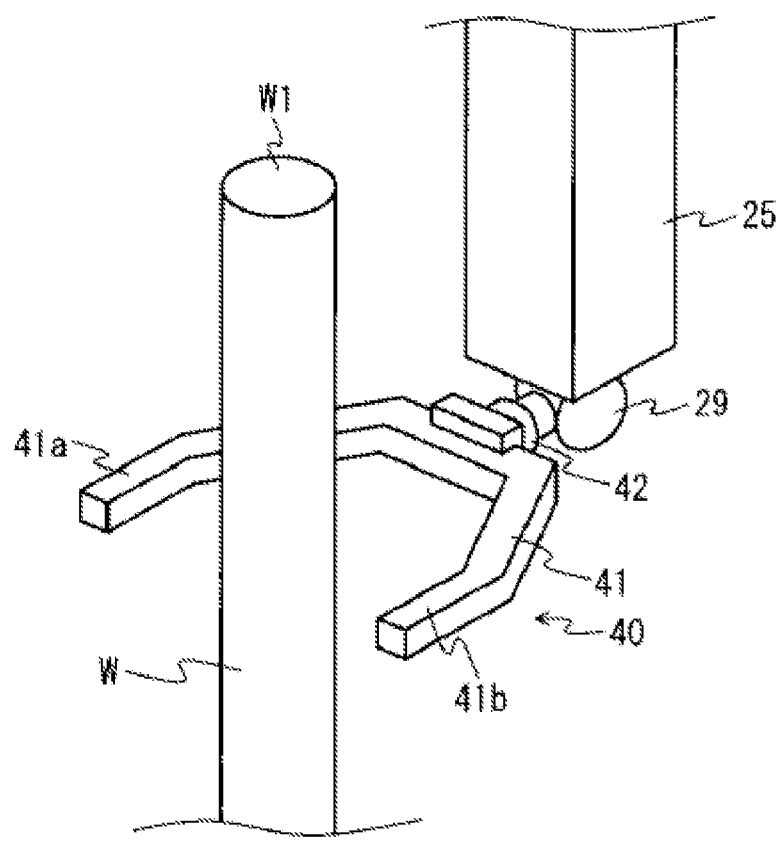
FIG. 3 is a schematic view illustrating a configuration of a measurement probe.
Figure 4:
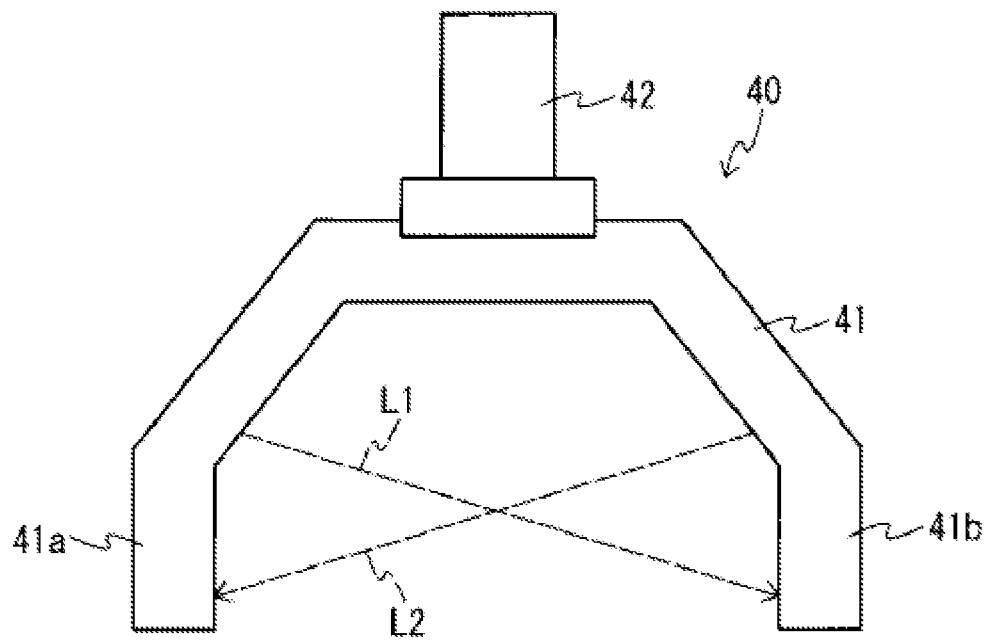
FIG. 4 is a schematic view illustrating laser lights emitted by the measurement probe.

FIG. 3 is a schematic view illustrating a configuration of the measurement probe 40. FIG. 4 is a schematic view illustrating laser lights L1 and L2 emitted by the measurement probe 40. In FIG. 3, the measurement probe 40 measures a pipe W that is oriented vertically, but the measurement probe 40 is also capable of measuring a horizontally oriented pipe W.

As illustrated in FIG. 3, the measurement probe 40 is mounted to the ram 25 via an attachment 29. This allows the measurement probe 40 to rotate, in addition to displacing in the X, Y, and Z axis directions noted above, and therefore enables measurement of pipes W having various shapes.

In addition, as illustrated in FIG. 3, the measurement probe 40 includes a measurement portion 41 that includes two tip portions (tip ends) 41a and 41b, which are split in a forked configuration, and a coupling portion 42 that is coupled to the attachment 29. The measurement portion 41 is provided with optical emitters 43a and 43b (FIG. 2) emitting laser light, and optical receivers 44a and 44b (FIG. 2) receiving the light emitted by the optical emitters 43a and 43b. For example, the optical emitters 43a and 43b may be provided to the tip portion 41a and the optical receivers 44a and 44b may be provided to the tip portion 41b.

As illustrated in FIG. 4, the measurement probe 40 performs a measurement by firing the two laser lights L1 and L2 between the tip portions 41a and 41b such that the laser lights L1 and L2 mutually intersect. Specifically, the laser light L1 emitted by the optical emitter 43a provided to the tip portion 41a is received by the optical receiver 44a, and the laser light L2 emitted by the optical emitter 43b provided to the tip portion 41b is received by the optical receiver 44b. When the presence of the pipe W between the tip portions 41a and 41b, as illustrated in FIG. 3, blocks the laser light emitted by the optical emitters 43a and 43b, the measurement probe 40 detects the pipe W.

Returning to FIG. 2, the control device 70 controls overall operations of the pipe measuring apparatus 1. The control device 70 includes a memory 72 and a controller 74. The memory 72 includes, for example, a ROM (Read Only Memory) and RAM (Random Access Memory). The memory 72 stores programs executed by the controller 74 and various kinds of data. For example, the memory 72 stores measurement results obtained by the measurement probe 40.

The memory 72 also stores a parts program that relates to operations of the displacement mechanism 20 during measurement of a single pipe. For example, the memory 72 may store a parts program that includes information related to a displacement direction, displacement amount, and displacement route of the measurement probe 40 in the X, Y, and Z axis directions driven by the driver 30 during measurement of the single pipe. The parts program may be created by the control device 70 immediately after measurement of the single pipe, or during measurement of the single pipe.

The controller 74 is a CPU (Central Processing Unit), for example. The controller 74 controls operations of the pipe measuring apparatus 1 by executing a program stored in the memory 72. The controller 74 parses a three-dimensional shape of the pipe based on the measurement results for the pipe acquired by the measurement probe 40.

When measuring a pipe having a shape identical to a pipe measured when creating the parts program stored in the memory 72, the controller 74 performs the pipe measurement automatically in accordance with the parts program stored in the memory 72. Therefore, measurement of pipes having identical shapes can be performed both rapidly and with a high degree of accuracy, which is useful when measuring mass-produced pipes.

In addition, the controller 74 uses the parts program and displaces the measurement probe 40 such that the two laser lights L1 and L2 contact an end face of the pipe (for example, an end face W1 illustrated in FIG. 3). Ordinarily, when measuring an end face of a pipe manually using a multijoint arm-type measuring device, the laser light is invisible, and so a measurement operator has difficulty adjusting the position of the measurement probe 40 such that the laser light strikes the end face. In contrast, when the pipe measuring apparatus 1 uses the parts program as in the present embodiment, the position of the end face W1 of the pipe W is more readily identified, and when the coordinates for the point of intersection of the two laser lights L1 and L2 of the measurement probe 40 are set at the end face W1, the end face W1 of the pipe W can be measured both rapidly and with a high degree of accuracy.

Process Performed when Measuring Pipes Having Identical Shape

A procedural flow of a process performed when measuring a plurality of pipes having an identical shape is described with reference to FIG. 5. The present process is achieved by the controller 74 of the control device 70 executing a program stored in the memory 72.

Figure 5:
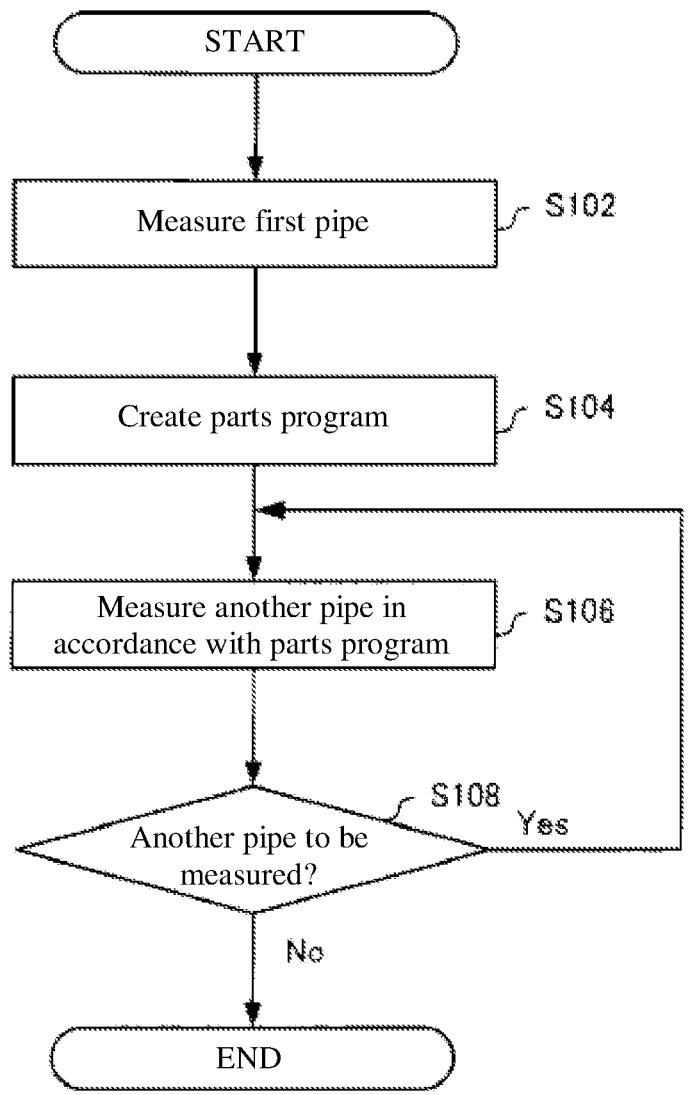
FIG. 5 is a flow chart illustrating a process performed when measuring a plurality of pipes having an identical shape.

FIG. 5 is a flow chart illustrating a process performed when measuring a plurality of pipes having an identical shape. In the process illustrated in FIG. 5, first, a first pipe placed on the base 10 is measured by the measurement probe 40 (step S102). At this point, the measurement operator performs the pipe measurement by operating the displacement mechanism 20 to appropriately displace the measurement probe 40 relative to the pipe. When the measurement ends, the measurement operator removes the measured pipe from the base 10.

Next, the control device 70 creates a parts program that relates to operations of the displacement mechanism 20 during measurement of the first pipe (step S104). The control device 70 creates the parts program immediately after measurement of the first pipe, or during measurement of the first pipe.

Then, after the measurement operator places another pipe (second pipe) having a shape identical to the first pipe on the base 10, the measurement operator performs an operation such that the pipe measuring apparatus 1 begins measurement. The control device 70 then performs measurement of the second pipe in accordance with the parts program stored in the memory 72 (step S106). At this point, unlike the measurement of step S102, measurement is performed while the displacement mechanism 20 automatically displaces in accordance with the parts program, and thus the second pipe can be measured with a high degree of accuracy in a shorter amount of measurement time than the first pipe.

When there is another pipe to be measured (step S108: Yes), the above-described process of step S106 is repeated. In other words, measurement of the third pipe onward is performed by causing the displacement mechanism 20 to operate automatically in accordance with the parts program used when measuring the second pipe. Accordingly, the greater the number of pipes to be measured, the more the total measurement time required to measure the pipes can be compressed. Meanwhile, when there are no other pipes to be measured (step S108: No), the process ends.

Benefits of the Present Embodiment

The pipe measuring apparatus 1 according to the embodiment described above includes the measurement probe 40 that performs a non-contact measurement of the pipe, and the displacement mechanism 20 that displaces the measurement probe 40 in the X, Y, and Z axis directions relative to the base 10. In other words, the pipe measuring apparatus 1 is a coordinate measuring apparatus equipped with a pipe measurement probe. According to the above configuration, compared to measuring pipe using a conventional multijoint arm-type measuring device, the measurement probe 40 can be displaced by the displacement mechanism 20 of a coordinate measuring apparatus having a high degree of measurement accuracy, and therefore measurement error can be inhibited and as a result, the pipe can be measured with a high degree of accuracy. In particular, when measuring a plurality of pipes, by using a parts program created during measurement of the first pipe, the second pipe onward can be measured in a short amount of time and with a high degree of accuracy.

In the above description, the measurement probe 40 is configured to displace in the X, Y, and Z axis directions relative to the base 10 on which the pipe is placed. However, the present invention is not limited to this. For example, the base 10 on which the pipe is placed may be displaced in any of the X, Y, and Z axis directions.

In addition, in the above description, the measurement probe 40 is configured to emit the two laser lights L1 and L2 to measure the pipe. However, the present invention is not limited to this. For example, the measurement probe 40 may instead emit one laser light to measure the pipe.

Furthermore, in the above description, the pipe measuring apparatus 1 is configured as a measuring apparatus having the base 10 on which the pipe is placed. However, the present invention is not limited to this. For example, the pipe measuring apparatus 1 may instead be a gantry-type (gate-type) measuring apparatus not having the base 10.

The present invention is described above by way of an embodiment, but the technical scope of the present invention is not limited to that described in the embodiment above, and various modifications are possible within the scope of the description. For example, the specific embodiments of separated or integrated devices are not limited to the embodiment given above, and all or a portion thereof can be configured to be functionally or physically separated or integrated in any desired units. In addition, novel embodiments produced by the arbitrary combination of a plurality of embodiments are also included in the scope of the embodiment of the present invention. The benefits of a novel embodiment produced by such combination also include the benefits of the original embodiment of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A pipe measuring apparatus comprising:
  a pipe measurement probe that performs non-contact measurement of a pipe;
  a displacer that displaces the pipe measurement probe in a first axis direction, a second axis direction orthogonal to the first axis direction, and a third axis direction orthogonal to both the first and second axis directions relative to the pipe;
  a base having a plate-shaped surface on which the pipe is being placed thereon; and
  a guide provided along the second axis direction on one first axis direction end of the base, wherein the guide is configured to guide the displacer in the second axis direction,
  wherein the displacer includes a column, a beam, a slider, a ram, and a driver,
  wherein the beam is provided so as to extend in the first axis direction,
  wherein one-length direction end of the beam is supported by the column and the other length-direction end of the beam is supported by a support column,
  wherein a bottom surface of the support column contacts the plate-shaped surface of the base,
  wherein the pipe is being placed on the plate-shaped surface, and
  wherein the beam is configured to be displaced by the driver in the second axis direction together with the column.

2. The pipe measuring apparatus according to claim 1, further comprising:
   a memory that stores a parts program that relates to operations of the displacement mechanism during measurement of a single pipe; and
   a controller which, upon execution of the parts program stored in the memory, causes the measurement to be performed in accordance with the parts program stored in the memory, when measuring a pipe having a shape identical to the single pipe.

3. The pipe measuring apparatus according to claim 1, wherein the pipe measurement probe emits two laser lights such that the laser lights intersect with the pipe, such that the pipe measurement probe performs the non-contact measurement of the pipe.

4. The pipe measuring apparatus according to claim 2, wherein the pipe measurement probe emits two laser lights such that the laser lights intersect with the pipe, such that the pipe measurement probe performs the non-contact measurement of the pipe.

5. The pipe measuring apparatus according to claim 3, further comprising a controller that displaces the pipe measurement probe with the displacer such that the two laser lights contact an end face of the pipe.

6. The pipe measuring apparatus according to claim 4, further comprising a controller that displaces the pipe measurement probe with the displacer such that the two laser lights contact an end face of the pipe.

7. The pipe measuring apparatus according to claim 3, wherein:
   the pipe measurement probe includes two tip ends that are split in a forked configuration, and
   the two laser lights are emitted between the two tip ends.

8. The pipe measuring apparatus according to claim 4, wherein:
   the pipe measurement probe includes two tip ends that are split in a forked configuration, and
   the two laser lights are emitted between the two tip ends.

9. The pipe measuring apparatus according to claim 5, wherein:
   the pipe measurement probe includes two tip ends that are split in a forked configuration, and
   the two laser lights are emitted between the two tip ends.

10. The pipe measuring apparatus according to claim 6, wherein:
    the pipe measurement probe includes two tip ends that are split in a forked configuration, and
    the two laser lights are emitted between the two tip ends.

11. The pipe measuring apparatus according to claim 1, wherein the column stands upright on the guide and configured to be displaced by the driver along the guide in the second axis direction.

12. The pipe measuring apparatus according to claim 1,
    wherein the slider is supported by the beam and is formed in a tube shape along the third axis direction, and
    wherein the slider is configured to be displaced by the driver along the beam in the first axis direction.

13. The pipe measuring apparatus according to claim 1,
    wherein the ram is inserted through an interior of the slider, and
    wherein the ram is configured to be displaced by the driver within the slider in the third axis direction.

14. The pipe measuring apparatus according to claim 1, wherein the plate-shaped surface of the base is flat.

15. The pipe measuring apparatus according to claim 1, wherein the plate-shaped surface of the base is rectangular.

\* \* \* \* \*